United States Patent [19]

Siewert et al.

[11] Patent Number: 4,630,698

[45] Date of Patent: Dec. 23, 1986

[54] SELF-STORING SIDE PANEL

[75] Inventors: Robert L. Siewert, Benton Harbor; Edmund K. Varnelis, St. Joseph, both of Mich.

[73] Assignee: Clark Michigan Company, Cleveland, Ohio

[21] Appl. No.: 765,090

[22] Filed: Aug. 13, 1985

[51] Int. Cl.[4] ............................................. B62D 25/10
[52] U.S. Cl. .................................. 180/69.24; 160/201; 180/89.17; 296/24 R
[58] Field of Search ................. 180/69.24, 69.2, 69.21, 180/89.11, 89.17; 49/57, 147, 209; 296/24 R; 312/138; 160/201

[56] References Cited

U.S. PATENT DOCUMENTS

| 94,016 | 8/1869 | Mayo et al. | 312/138 R |
|---|---|---|---|
| 1,164,716 | 12/1915 | Helvern | 49/147 |
| 1,911,600 | 5/1933 | Bobertz, Jr. et al. | 180/69.2 |
| 2,237,677 | 4/1941 | Lewis | 180/69.21 |
| 2,794,511 | 6/1957 | Mackie | 180/69.24 |
| 3,487,887 | 1/1970 | Pensa | 180/69.21 |
| 3,853,729 | 2/1975 | Von Fummetti | 180/69.24 |
| 3,918,540 | 11/1975 | Haupt | 180/69.24 |
| 4,083,149 | 4/1978 | Hickman et al. | 49/147 |

Primary Examiner—John J. Love
Assistant Examiner—Eric D. Culbreth
Attorney, Agent, or Firm—Kenneth C. Witt; John C. Wiessler

[57] ABSTRACT

A self-storing panel mechanism for a vehicle engine compartment which has a lower side frame member extending longitudinally of the vehicle adjacent one side of the compartment, and an upper structural portion extending longitudinally above the lower side frame member and forming with the lower side frame member an access opening into the engine compartment. A movable side panel is detachably secured to the upper structural portion and extends downwardly across the access opening. There is at least one vertically disposed guide cable extending from the lower side frame member to a connection with the upper structural portion frame member. The guide cable normally holds the side panel in position to close the access opening but the side panel can easily be moved to the open position by disengaging the panel from the upper structural portion and allowing it to move by gravity downwardly without disconnecting the guide cable.

9 Claims, 6 Drawing Figures

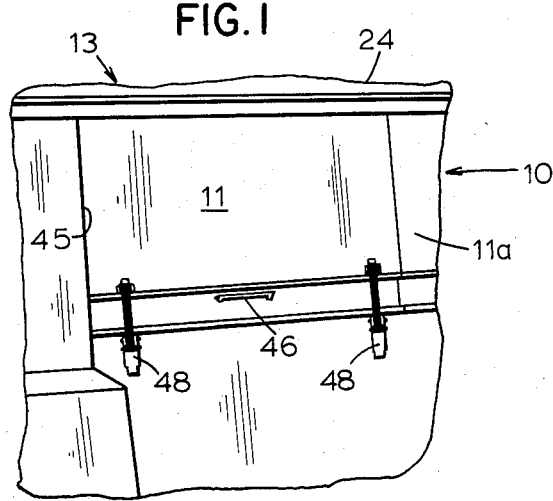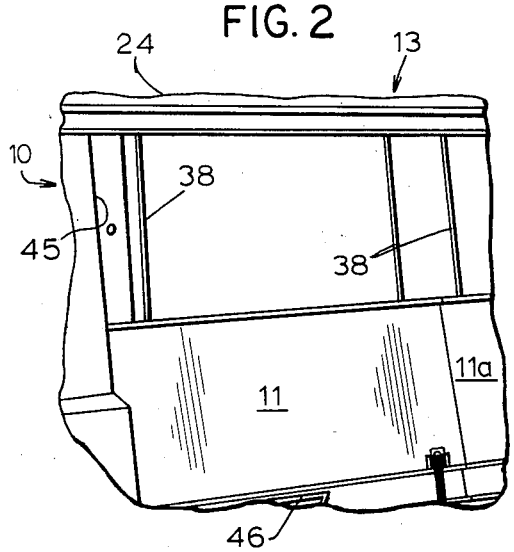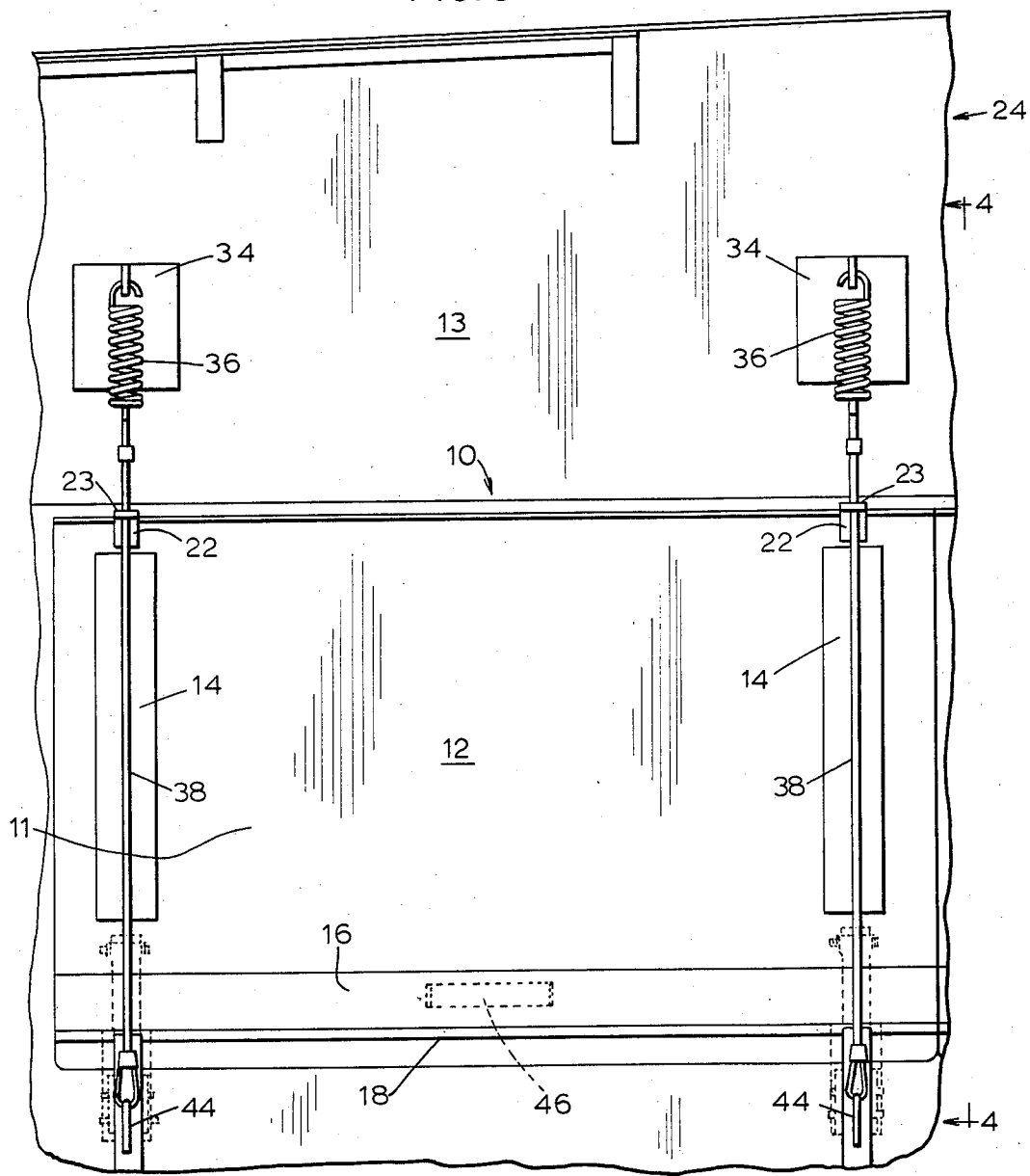

SELF-STORING SIDE PANEL

BACKGROUND OF THE INVENTION

1. Field of the Invention

This invention relates to a movable side panel for a vehicle engine compartment or the like and more particularly to such a side panel which is stored on the vehicle when the panel is moved from the closed position to the open position.

2. Description of the Prior Art

U.S. Pat. No. 2,794,511 Mackie shows a mechanism in which the side panels of an engine hood are moved outwardly and upwardly to an elevated position where there is access to the engine and other mechanisms under the hood.

In U.S. Pat. No. 3,863,729 Von Fummetti et al there is a pair of engine side shield structures on opposite sides of a vehicle engine which are supported on the frame of the vehicle. Each side shield structure includes a fixed baffle plate section, and upper and lower access doors which overlap the baffle section. The upper and lower doors are pivotally connected along the lower edges for swinging movement between respective closed positions wherein the panels are disposed vertically, one above the other, so as to block access to the inside of the engine compartment, and open positions wherein they are displaced angularly from their closed positions so as to permit access to the inside of the engine compartment.

In U.S. Pat. No. 3,918,540 Haupt the engine hood of a vehicle extends from a grill at the extreme front of the vehicle over an accessory compartment and over the engine compartment to a fire wall. The hood provides hanger means and slots for receiving hooks on the upper edge of a removable side panel. As the side panel is dropped on to the hood the hooks drop into the slots. The side panel pivots downwardly and inwardly against the vehicle and latching means are provided to detachably fasten the side panel to the side of the vehicle.

SUMMARY OF THE INVENTION

The present invention is a self-storing panel mechanism for a vehicle engine compartment which has a lower side frame member extending longitudinally of the vehicle adjacent one side of the compartment, and an upper structural portion extending longitudinally above the lower side frame member and forming with the lower side frame member an access opening into the engine compartment. A movable side panel is detachably secured to the upper structural portion and extends downwardly across the access opening to close it. A vertically disposed guide cable extends from the upper structural portion to a connection with the lower frame member. The side panel can easily be moved from the closed to the open position by disconnecting the panel from the upper structural portion and moving it downwardly and outwardly through the access opening.

BRIEF DESCRIPTION OF THE DRAWING

FIG. 1 is a perspective view of a portion of a vehicle which includes a side panel according to the present invention, with the side panel in the closed position, FIG. 2 is a similar view showing the vehicle with the side panel open, FIG. 3 is a view from inside the vehicle of the same side panel in the closed position on the vehicle taken along the line 3—3 of FIG. 4.

DESCRIPTION OF THE PREFERRED EMBODIMENT

Figure 4:
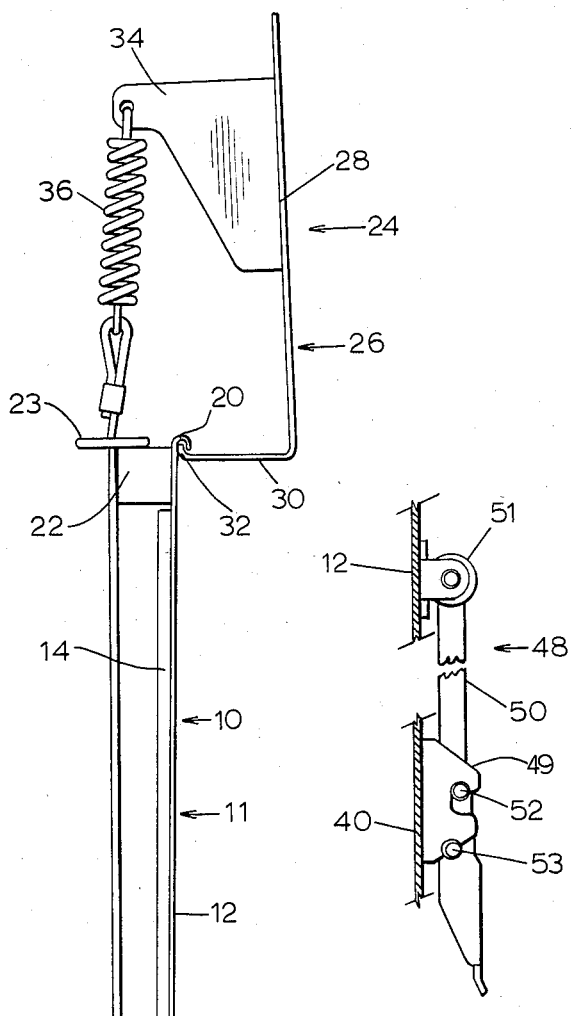
FIG. 4 is a sectional view along the line 4—4 of FIG. 3.

In all of the figures of the drawing the numeral 10 indicates a self-storing panel mechanism according to the present invention which includes at least one side panel member 11. In FIG. 1 side panel 11 is shown in the closed position and a portion of another similar side panel 11a is shown adjacent panel 11 and also in the closed position. The vehicle 13 partially shown in FIGS. 1 and 2 uses two side panels such as 11 and 11a side-by-side, on each side of the hood. FIG. 2 of the drawing is a perspective view of the same vehicle 13 shown with side panels 11 and 11a of this invention in the open position.

Referring to FIG. 4 of the drawing, there is shown a view of the edge of the panel 11, along the line 4—4 of FIG. 3. The panel 11 includes a piece of sheet metal 12 having the configuration illustrated in FIGS. 3, 4 and 5. There are vertical stiffeners 14 secured to the inner surface of member 12. Across the bottom of panel 11 there is a horizontal offset portion 16 which is formed in member 12 by stamping or other equivalent means. Near the bottom of member 12 a stiffener 18 extends across the panel from side to side. At the top of member 12 a hook 20 is formed. Near the top of of panel 11 brackets 22 extend inwardly from member 12.

The illustrative vehicle 13 on which the panel mechanism 10 of this invention is shown includes a hood assembly 24 which is part of the structure of the vehicle; this is referred to in the claims as an upper structural portion. Assembly 24 includes a sheet metal member 26 having a vertically disposed portion 28, a horizontally disposed portion 30 and a hook 32 with which hook 20 of the side panel engages. The hood assembly 24 also includes brackets 34, and suspended from brackets 34, two for each side panel in the preferred embodiment are tension springs 36. Depending from each spring 36 is a cable or wire rope 38 which extends through guide 23 on bracket 22 which is a part of panel 11.

Near the bottom of panel 11 a portion of a lower side frame member 40 of the vehicle is shown. It has a top surface 42. At the inside of the lower side frame cables 38 are each connected to a bracket 44 which is secured to frame member 40 as by welding. The cables 38 are of a length such that the springs 36 cause the cables 38 always to be under tension whereby they normally hold panel 11 in the closed position.

Figure 5:
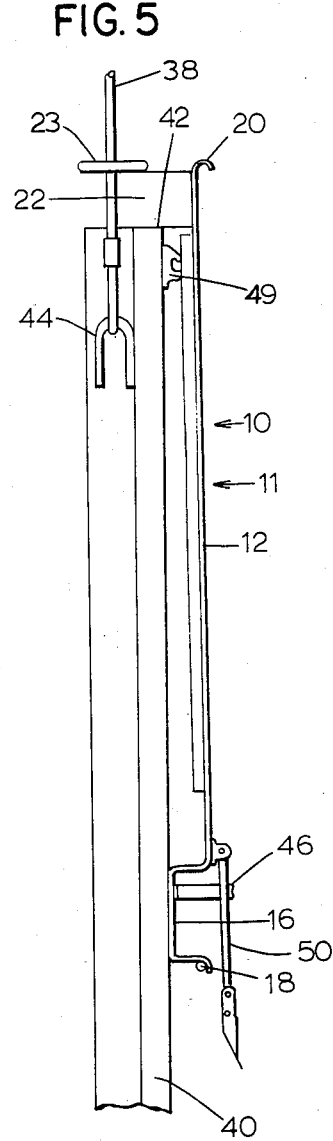
FIG. 5 is a similar view with the side panel in the lowered position.

FIG. 4 of the drawing shows the side panel 11 in the closed position the same as FIG. 1. FIG. 5 of the drawing shows the side panel in the open position corresponding to FIG. 2. In going from the closed to the open position the side panel 11 moves to the outside of the vehicle through opening 45, and offset portion 16 of the side panel comes to rest against lower frame portion 40 in the open position of FIG. 5. At the same time, brackets 22 of the panel 11 rest on surface 42 when the side panel is in the open or lowered position. Each bracket 22 carries a guide member 23 through which cable 38 extends, which serves as a guide for the movement of panel 11 upwardly and downwardly between the closed and open positions.

As shown in all figures of the drawing each panel such as 11 includes a handle 46 on the outer surface near the bottom edge, and preferably within offset portion 16. If the panel 11 is in the closed position indicated in FIG. 1 and it is desired to move it to the open position of FIG. 2 it is necessary only for the operator to grasp handle 46, raise the panel 11 slightly to disengage hooks 20 from hooks 32 and then push the top of the panel inwardly a small amount with his other hand, after which the panel moves downwardly by gravity from the position shown in FIG. 1 to that shown in FIG. 2 providing ready access to the inside of the engine compartment while the panel is stored on the vehicle in a convenient location which is out of the way. When it is desired to return the panel to its closed position it is necessary only for the operator to grasp the handle 46 and raise the panel back up to its upper latched closed position of FIGS. 1 and 4.

Figure 6:
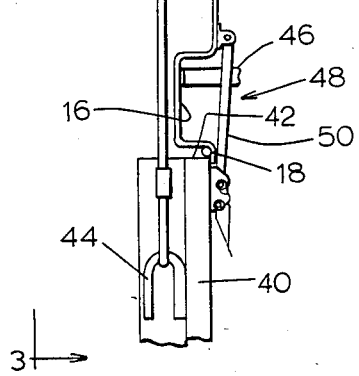
FIG. 6 shows a latching device which is used for the side panel.

To secure the panel in the upper position a pair of latching devices 48 is provided. One of these is shown in FIG. 6 of the drawing. Each latching device 48 comprises a flexible and resilient member 50 made of rubber or other equivalent material which is secured at 51 to a panel such as panel 11 just above the upper margin of offset portion 16. A mating bracket 49 is secured to the outer surface of frame member 40. To secure the latch the member 50 is stretched and maneuvered so that two projections 52 and 53 on member 50 engage mating recesses in bracket 49.

In both the closed and open positions and intervening transitory positions the guide cables 38 and the guides 23 maintain the side panel in the proper attitude at all times.

While we have described and illustrated herein a preferred embodiment of our invention which is the best mode contemplated for its use, it will be appreciated that modifications may be made. Accordingly it should be understood that we intend to cover all such modifications which fall within a true spirit and scope of our invention.

We claim:

1. A panel mechanism for a vehicle engine compartment which has a lower side frame member extending longitudinally of the vehicle adjacent one side of the compartment, the lower side frame member having an inside surface, and an upper structural portion extending longitudinally above the lower side frame member and forming with said lower side frame member an access opening into the engine compartment, the upper structural portion having an inside surface, the panel mechanism comprising a movable side panel which in the closed position extends across said access opening, first means detachably securing the upper edge of said panel to said inside surface of said structural portion, at least one vertically disposed guide cable extending from a support on the inside surface of the upper structural portion to said inside surface of the lower frame member, a guide secured to said panel through which said guide cable extends, and second means for securing the lower edge of said panel to the lower side frame member with said first means secured, and releasing the lower edge of said panel from said lower side frame for detaching said upper edge of the panel from said upper structural portion and allowing the panel to move by gravity to the open position outside the engine compartment.

2. A panel mechanism as in claim 1 wherein a tension spring connects said guide cable to said support of the upper structural portion.

3. A panel mechanism as in claim 1 wherein there is a bracket on the inner surface of said panel adjacent said upper edge and said bracket rests on the top of said frame member when the panel mechanism is in the open position.

4. A panel mechanism as in claim 3 wherein said guide is secured to said bracket.

5. A panel mechanism as in claim 1 wherein said second means comprises a handle for manipulating said panel which is secured to the outer surface of the panel.

6. A panel mechanism as in claim 5 wherein at least one latch member is secured to the outer surface of said panel.

7. A panel mechanism as in claim 6 wherein a matching latch part is secured to the outer surface of said lower frame, and said latch part cooperates with said latch member to secure said panel in said closed position.

8. A panel mechanism as in claim 7 wherein said latch member is of flexible resilient material.

9. A panel mechanism as in claim 1 wherein said first means comprises an elongated hook along the upper edge of said panel and a mating hook on said structural portion.

* * * * *